Dec. 14, 1926.                                                    1,610,739
W. M. BRITTON
COUPLING FOR DIFFERENTIAL GEAR RINGS
Filed Nov. 10, 1923
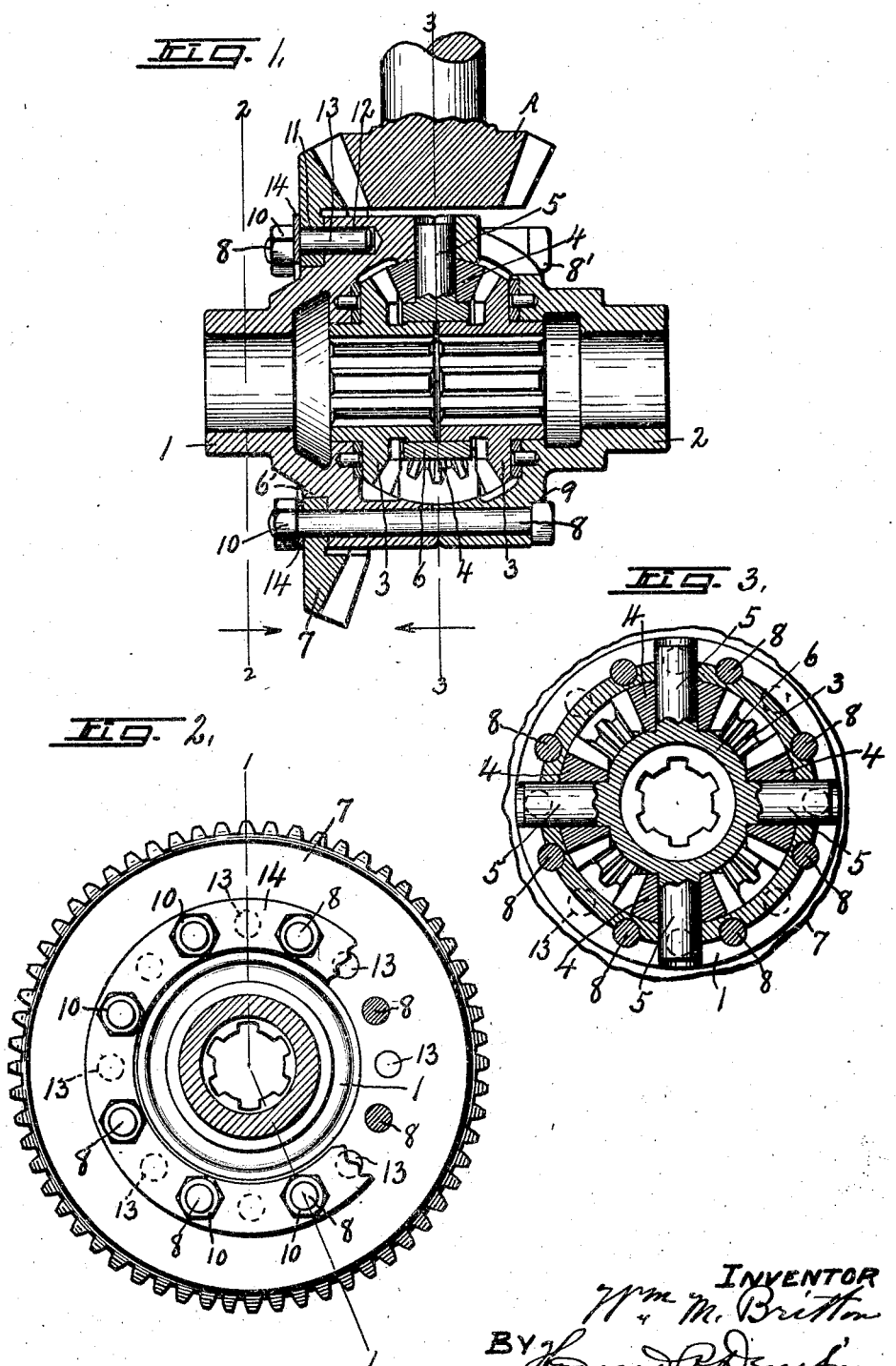

Patented Dec. 14, 1926.

1,610,739

UNITED STATES PATENT OFFICE.

WILLIAM M. BRITTON, OF SYRACUSE, NEW YORK.

COUPLING FOR DIFFERENTIAL-GEAR RINGS.

Application filed November 10, 1923. Serial No. 673,997.

This invention relates to gear ring couplings for the differential gearing of motor vehicles and analogous uses in which two rotative elements are adapted to be secured together end to end for simultaneous rotation.

These gear rings are usually made separate from and bolted to one end of the supporting frame for the differential gearing for intermeshing engagement with the driving pinion which is actuated by the engine shaft and as usually constructed, the bolts are subjected to severe shearing strains by the relatively high torque in the transmission of power from the pinion to the frame and thence through the axle sections to the traction wheels resulting frequently in loosening or shearing of the bolts unless extra precaution is taken by some other means to relieve the shearing strains.

I am aware that certain devices such as interlocking peripheral teeth on the gear ring and frame have heretofore been proposed, for relieving these strains, but the formation of these peripheral teeth and grooves sufficiently accurate to prevent relative rotary movement of those parts is found to be extremely difficult and laborious particularly when formed before hardening of the gear ring which almost invariably produces more or less deformation or warping of the ring.

The main object of my present invention is to produce a more efficient and economic means for coupling the gear ring to the frame for resisting these shearing strains upon the bolts by inserting hardened steel studs in registering openings in the ring and frame between the bolts which are usually arranged in equally spaced relation around the axis of the ring and frame.

Another object is to provide means clamped in place by the bolts for holding the studs in operative position against accidental endwise displacement.

Other objects and uses relating to specific parts of the coupling will be brought out in the following description.

In the drawings:—

Figure 1 is a horizontal sectional view of a differential gear-supporting frame and gear ring mounted thereon together with the coupling means forming the subject matter of my present invention and also showing the driving pinion for the gear ring.

Figures 2 and 3 are transverse sectional views taken respectively, in the planes of lines 2—2 and 3—3, Figure 1, which latter is taken in the plane of line 1—1, Figure 2.

In order that my invention may be clearly understood, I have shown it as applied to a differential gear frame composed of sections —1— and —2—, and secured coaxially end to end for receiving and supporting internal differential gears —3— and pinions —4—, the gears —3— being coaxial in opposed relation, while the pinions are journaled upon suitable studs —5— forming part of a spider —6— and having their outer ends seated in suitable openings in the adjacent faces of the members —1— and —2— as shown more clearly in Figures 1 and 3.

The gears —3— are splined in any well known manner upon the adjacent ends of relatively rotatable shaft sections not shown, but adapted to carry the traction wheels of the vehicles.

The outer end of one of the frame sections as —1—, is provided with an annular recess —6'— for receiving and supporting a gear ring —7— which, together with the sections —1— and —2— are provided with registering bolt openings in uniformly spaced relation circumferentially for receiving a corresponding number of clamping bolts —8—.

These clamping bolts extend entirely through the sections —1— and —2— and gear ring —7— and serve the double purpose of clamping the sections to each other and also of clamping the gear ring to the outer end face of the section —1—.

The heads as —8'—, of the bolts are usually square or angular in cross section, while the adjacent end of the section —2— is provided with recesses for receiving said heads and also for forming shoulders as —9— adapted to be engaged by one of the flat sides of the bolts to hold said bolts against turning while being tightened by means of the nuts as —10— on the opposite ends thereof.

The portions of the gear ring —7— and frame section —1— midway between the bolts and preferably in the same circle are provided respectively with registering openings —11— and —12— for receiving a corresponding number of hardened steel studs —13—, the openings —12— preferably consisting of sockets extending only part way through the frame section —1— so as not to interfere in any way with the supporting studs —5— for the pinions —4—.

The studs —13— are made to fit snugly in their respective openings —11— and —12— and of just sufficient length when seated against the inner ends of the sockets to cause their outer ends to be substantially flush with the corresponding outer face of the gear ring —7—.

Suitable means is provided for holding the studs —13— against endwise displacement and for this purpose is provided a retainer ring —14— having apertures registering with the bolt openings for receiving said bolts whereby when the bolts are tightened, their respective nuts —10— will serve to firmly hold the retainer ring in place or in fixed relation to the gear ring and sections —1— and —2— of the frame.

The portions of the stud-retaining ring —14— between the bolts —8— are imperforate and extend across the outer end faces of the studs —13— so that when the bolts —8— are firmly tightened by their respective nuts —10—, the ring —14— will be firmly held in place while the ring will serve to hold the studs against outward endwise displacement.

The teeth of the gear ring —7— and adjacent portions of said ring are usually hardened to resist excessive wear by contact with the teeth of the driving pinion as —A—, but the remaining portions of the gear ring and adjacent portions of the frame sections —1— and —2— are usually unhardened which permits the holes for receiving the bolts —8— and studs —13— to be initially formed slightly under size and subsequently reamed to just the desired size for easily receiving the bolts and studs, and inasmuch as the bolts are not necessarily hardened, it is advisable to use hardened steel studs —13— closely fitting in the registering openings which receive them so as to take the shearing strains from the bolts while the retaining ring —14— serves to hold the studs in place against endwise displacement but may be readily removed at any time by removing the nuts —10— and retainer ring —14— which permits the removal of the gear ring —7—.

I claim:—

1. A coupling for differential gears comprising co-axial rotary members bolted together end to end at spaced intervals and provided with registering openings, studs inserted in the registering openings, and a stud-retaining ring secured in fixed relation to said members and extending across the outer ends of the studs.

2. A coupling comprising coaxial rotary members bolted together end to end at spaced intervals and provided with registering openings, studs inserted in the registering openings, and a stud-retaining ring secured in fixed relation to said members by the bolts and extending across the outer ends of the studs.

3. A coupling for connecting a gear ring and the differential gear-supporting frame comprising bolts securing the gear ring to the frame at intervals about the axis of the ring, studs inserted in the registering openings in the ring and frame, and means secured in place by the bolts for holding the studs against endwise displacement from said openings.

In witness whereof I have hereunto set my hand this 7th day of November, 1923.

WILLIAM M. BRITTON.